United States Patent [19]

Armor et al.

[11] 4,071,791

[45] Jan. 31, 1978

[54] REVERSE FLOW COOLED DYNAMOELECTRIC MACHINES WITH NOVEL COOLING SYSTEM

[75] Inventors: Anthony F. Armor, Schenectady; Casmer P. Stanwick, Amsterdam, both of N.Y.

[73] Assignee: General Electric Company, Schenectady, N.Y.

[21] Appl. No.: 691,365

[22] Filed: June 1, 1976

[51] Int. Cl.$^2$ .............................................. H02K 9/00
[52] U.S. Cl. ...................................... 310/59; 310/65
[58] Field of Search .................. 310/52, 54, 55, 57, 310/58, 59, 60, 64, 65

[56] References Cited

U.S. PATENT DOCUMENTS

| | | | |
|---|---|---|---|
| 2,186,232 | 1/1940 | Baudry | 310/55 |
| 2,427,702 | 9/1947 | Baudry | 310/57 |
| 2,650,994 | 9/1953 | Bahn | 310/57 |
| 2,707,242 | 4/1955 | Baudry | 310/57 |
| 3,091,710 | 5/1963 | Shartrand | 310/55 |
| 3,265,912 | 8/1966 | Baudry | 310/59 |
| 3,652,881 | 3/1972 | Albright | 310/57 |
| 3,739,208 | 6/1973 | Shartrand | 310/58 |
| 3,833,826 | 9/1974 | Barton | 310/52 |

Primary Examiner—R. Skudy
Attorney, Agent, or Firm—John F. Ahern; Herbert E. Messenger; James W. Mitchell

[57] ABSTRACT

A reverse flow cooled dynamoelectric machine is provided with duplex gas coolers disposed in a side-by-side relationship. The coolers are baffled such that a portion of the gas flowing through both coolers is channeled to both the end portion of the rotor and to the stator and the body portion of the rotor so that both areas may be effectively cooled under reduced load operating conditions in the event of the failure of one of the coolers. In a preferred embodiment of the invention, first and second U-shaped baffles are disposed between the coolers and the inner walls of a removable dome, and a planar baffle engages adjacent free ends of the U-shaped baffles. The baffle components are dimensioned to ensure satisfactory flow of cooling gas to the body portion of the rotor. Aligned stator and rotor baffles are provided to segregate inlet zones and outlet zones in the gap between the stator and the rotor to better ensure effective cooling of the body portion of the rotor.

5 Claims, 2 Drawing Figures

REVERSE FLOW COOLED DYNAMOELECTRIC MACHINES WITH NOVEL COOLING SYSTEM

BACKGROUND OF THE INVENTION

1. Field of the Invention

This invention relates to reverse flow cooled dynamoelectric machines and more specifically to an improved arrangement for cooling the rotor and stator of such machine.

2. Description of the Prior Art

Dynamoelectric machines, such as large turbine-generators, typically are cooled by a gas such as hydrogen flowing through the interior of the rotor, through the gas gap between the rotor and the stator, and through the stator laminations. The stator windings may or may not be additionally cooled by a liquid flowing within the windings themselves. In the past, the most effective way of cooling a dynamoelectric machine was considered to be pumping gas directly from gas coolers to the end regions of the stator by a fan mounted on the generator rotor. This cooling scheme, of pumping cooling gas from a gas cooler across end regions of the stator core, through the stator and thereafter back to the gas cooler is known as forward flow ventilation. However, as the ratings of large turbine-generators increased, it was found that a heating problem in the end regions of the generator rotors became a limiting factor of the capability of these machines. In order to cool these localized areas of excessive heating in the generator rotors, a reverse flow cooling scheme was adopted wherein cooling gas was pumped by the fan toward two separate gas coolers, the flow being divided upstream from the coolers, a portion of it being pumped through a first cooler and then into the end turn region of the rotor to cool this region and the remainder of the gas being pumped through a second cooler and then through the cooling passages of the stator core and the body portion of the rotor. Such a reverse flow ventilation scheme is shown in U.S. Pat. No. 3,739,208 to Shartrand, assigned to the assignee of the present invention.

In such a cooling arrangement, shoud one of the coolers become inoperative, the associated portion of the dynamoelectric machine may not receive any cooled gas from that cooler. Therefore, should one of the coolers fail to operate either the stator laminations and rotor body or the rotor end turn region will receive no cooled gas at all. However, it is required that should one of the coolers fail to operate, the dynamoelectric machine remains operational at a reduced load. Starving either the stator laminations and rotor body or the rotor end turn region from cooled gas severely limits the reduced load capabilities of the dynamoelectric machine should one of the coolers fail to operate.

As the ratings of dynamoelectric machines increase, the machines themselves become physically larger. Modern turbine-generators are of a size which makes them extremely difficult to ship, requiring special means of transportation. To minimize the difficulties of transporting large dynamoelectric machines and to minimize the cost of this transportation, dynamoelectric machines have been constructed with removable gas coolers disposed within removable domes located at the ends of the dynamoelectric machines radially outwardly from the machine casing. However, some dome constructions such as that shown in U.S. Pat. No. 3,652,881 to Albright et al and U.S. Pat. No. 3,833,826 to Barton et al, assigned to the assignees of the present invention, have heretofore been used only with forward flow dynamoelectric machines.

In prior art reverse flow cooled dynamoelectric machines the high pressure and flow developed by the fan effectively cools the end turn portions of the rotors, eliminating these portions as areas limiting the output capabilities of the machines, and the thermal performance of the body portion of the dynamoelectric machine rotors has become a limiting factor in the output capabilities of the machine.

By the present invention, the above difficulties and disadvantages associated with the prior art are avoided and an approach is provided in which an improved arrangement of duplex gas coolers disposed in a removable dome and uniquely baffled allows both the body portion and the end turn portion of the rotor to be effectively cooled while also effectively cooling the stator of the machine even when the machine is operated at a reduced load due to the inoperability of one of the coolers.

Accordingly, it is an object of the present invention to provide a reverse flow cooled dynamoelectric machine wherein both the stator and the rotor are effectively cooled under reduced load conditions when one of the gas coolers employed in the machine is operative.

It is another object of the present invention to provide a reverse flow cooled dynamoelectric machine which provides improved thermal capability in the body portion of the dynamoelectric machine rotor under normal operation.

SUMMARY OF THE INVENTION

These and other objects apparent from the following detailed description, taken in connection with the appended claims and the accompanying drawing, are attained by providing duplex gas coolers disposed in a side-by-side relationship. The coolers are baffled such that a portion of the gas flowing through both coolers is channeled to both the end turn portion of the rotor and to the stator and the body portion of the rotor so that both areas may be effectively cooled under reduced load operating conditions in the event of the failure of one of the coolers. In a preferred embodiment of the invention, the baffle means comprises first and second U-shaped baffles disposed between the coolers and the inner wall of a removable dome. A planar baffle engaging adjacent free ends of the U-shaped baffles completes the baffle means. The baffle components are dimensioned to ensure satisfactory flow of cooling gas to the body and end portions of the rotor. Aligned stator and rotor baffles are provided to segregate inlet zones and outlet zones in the gap between the stator and the rotor to better ensure effective cooling of the body portion of the rotor.

DESCRIPTION OF A PREFERRED EMBODIMENT

Figure 1:
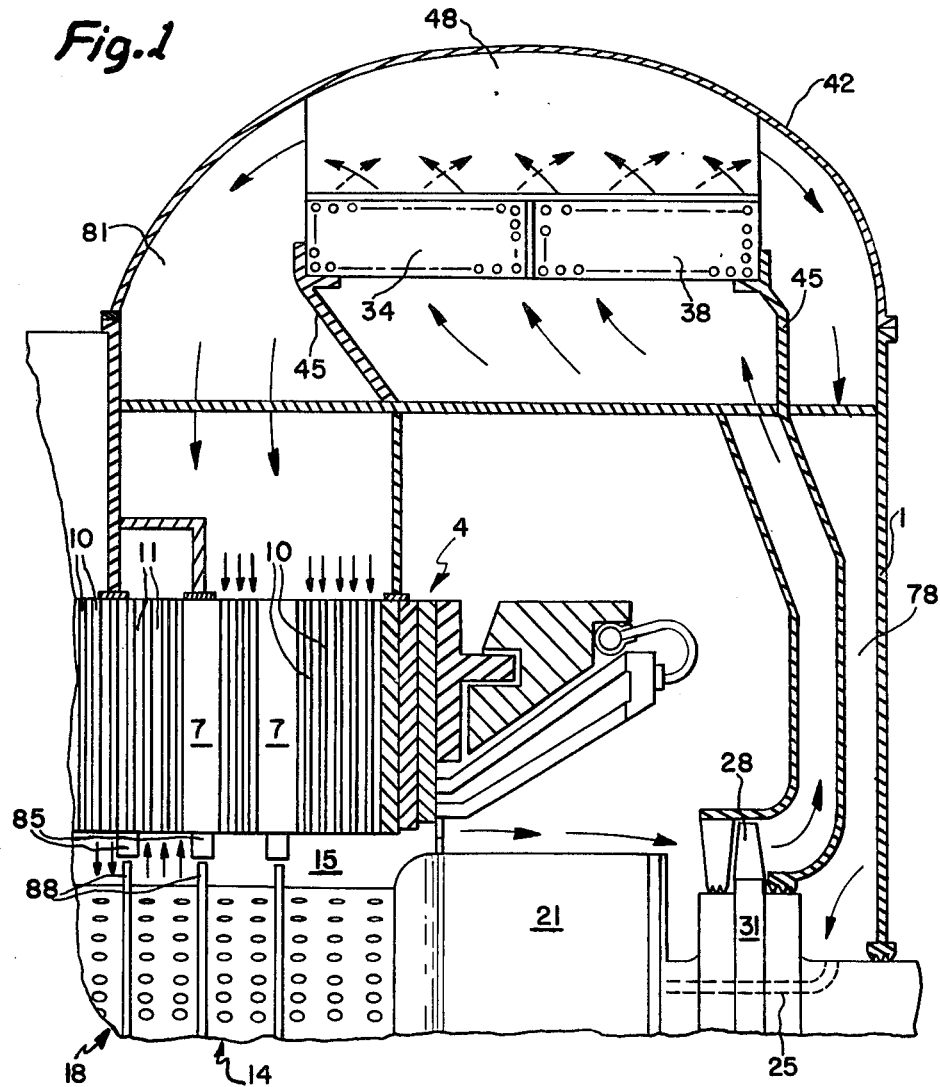
FIG. 1 is an elevation view, in partial section, of one end of a reverse flow cooled turbine-generator employing the improved cooling arrangement of the present invention.

FIG. 1 illustrates one end of a reverse flow cooled dynamoelectric machine. It will be understood that the opposite end of the dynamoelectric machine is similarly constructed. The dynamoelectric machine includes a gas-tight casing 1 pressurized with cooling gas such as hydrogen. A stator 4 comprising a core formed from a plurality of stacked laminations assembled in packages 7 is disposed within casing 1. A plurality of axially spaced radially extending cooling passages 10 and 11 are defined by the laminations and accommodate a flow of gas therethrough for the cooling of the core. Passages 10 conduct cooling gas through the core in a radially inward direction. Passages 11 conduct the gas through the core in a radially outward direction.

The dynamoelectric machine also includes a rotating field mounted in a rotor 14 which is disposed within stator 4 and spaced therefrom by a gas gap 15. Rotor 14 includes a body portion 18 cooled by gas picked up from gas 15 in a manner disclosed in U.S. Pat. No. 3,348,081 to D. M. Willyoung, assigned to the assignee of the present invention. The gas is pumped through cooling passages in the body portion 18 of rotor 14 through internal diagonal cooling passages machined within the field windings, a suitable construction being disclosed in U.S. Pat. No. 2,986,664 to D. M. Willyoung and P. A. Becker, which is assigned to the assignee of the present invention. Rotor 14 also includes an end turn portion held in place by a retaining ring 21 and cooled by gas pumped through a longitudinal passage 25 machined in the spindle of the rotor communicating with the end turn portion under retaining ring 21. The cooling gas is pumped by a fan 28 fixed to a fan ring 31 mounted on the spindle. To provide for the cooling of the gas, duplex coolers 34 and 38 are removably mounted in side-by-side relationship within a removable dome 42 on rails 45. The dome and coolers are removable to facilitate shipping. The dome may be assembled in the field by bolting or otherwise securing it to the remainder of the casing. The coolers are heat exchangers through which tubes cold water is circulated to cool hot gas passed therethrough.

Figure 2:
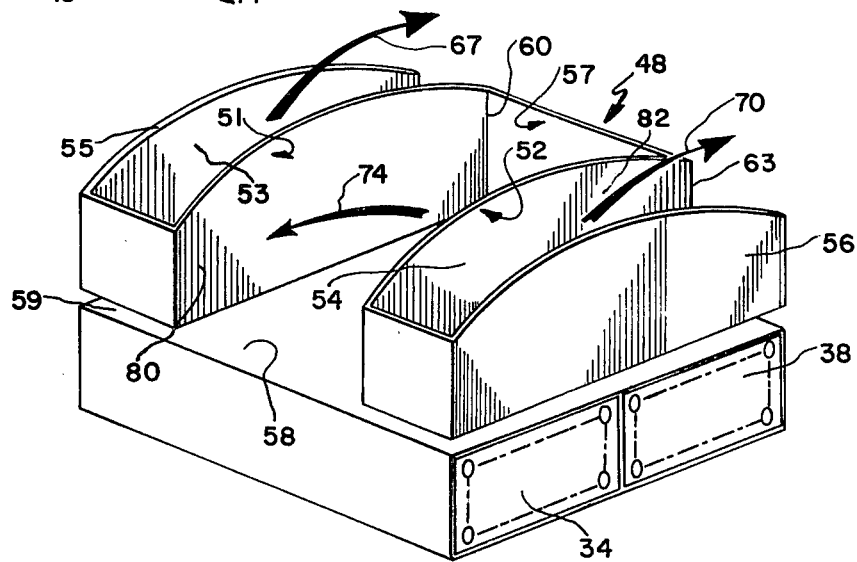
FIG. 2 is an isometric view of duplex gas coolers employed in the dynamoelectric machine of the present invention and the baffles employed therewith.

A baffle means of a particular configuration in particular relationship to the coolers 34 and 38 is employed to ensure that cooling is provided to all parts of the stator and rotor for satisfactory operation of the dynamoelectric machine under reduced load should one or the other of the coolers fail. The baffle means, indicated generally at 48 and shown in detail in FIG. 2, is disposed radially outwardly from the coolers within the dome 42. The baffle means comprises first and second U-shaped baffles 51 and 52 which extend transversely across the coolers 34 and 38 so that the areas 53 and 54 embraced by the U-shaped baffles are in communication with portions of both coolers 34 and 38. Although for purposes of ease of understanding the outboard sections 55 and 56 of U-shaped baffles 51 and 52 are shown as plates, they actually are the curved walls of the dome 48. The free end 60 of one leg of baffle 51 and the free end 63 of one leg of baffle 52 are engaged by a planar baffle 57, thereby defining a third U-shaped area 58 which also extends transversely across both the cooler 34 and the cooler 38 and is therefore in communication with both coolers. The upper edges of the baffles are curved as shown to conform to the upper inner surface of the dome and are in gas-tight contact therewith as is shown in FIG. 1.

With this arrangement a portion of the gas passing through each cooler is directed both the to stator (and from the stator to the body portion of the rotor) and to the end turn portion of the rotor. Arrows 67 and 70 in FIG. 2 indicate gas flow from the coolers through the areas 53 and 54 of the U-shaped baffles 51 and 52, respectively, to the end turn portion of the rotor. Arrow 74 indicates gas flow from both coolers through the area 58 to the stator and thence to the body portion of the rotor. To ensure that the gas follows these defined paths, the bottom edges of the U-shaped baffles 51 and 52 and the planar baffle 57 are closely spaced from the top surfaces of the coolers 34 and 38 by a leakage space 59. The top edges of these baffles are arranged in abutting sealing relationship with the inner wall of the dome 42. Leakage space 59 is normally of little significance with normal operation. In the event of a blockage or some other cause of improper fluid flow distribution it provides an alternate path of gas flow between conduits 78 and 81 as a redundant safety measure.

To provide for the conduction of cooling gas to the end turn portion of the rotor, a first conduit means 78 is provided at the extreme end of the dynamoelectric machine and communicates with coolers 34 and 38 through the interior of U-shaped baffles 51 and 52. A portion of the gas pumped to the coolers 34 and 38 by the fan 28 passes through the areas 53 and 54 within baffles 51 and 52, respectively, through first conduit means 78, and through longitudinal passage 25 into the end turn portion of the rotor. A second conduit means 81 communicates with coolers 34 and 38 through the area 58 between U-shaped baffles 51 and 52. A portion of the gas pumped through coolers 34 and 38 exits the coolers between U-shaped baffles 51 and 52 in the area 58 and is pumped by fan 28 through second conduit means 81 to cooling passages 10 in stator 4.

It can be seen from the above description that should either cooler 34 or 38 fail to operate, cooling gas will still be pumped to the stator (and thence to the body portion of the rotor) and to the end turn portion of the rotor, thereby facilitating effective performance of the dynamoelectric machine under reduced load in the case of the failure of either cooler.

Moreover, the arrangement of the baffle means 48 permits proportioning of the flow of cooling gas between the stator and the body portion of the rotor on the one hand and the end turn portion of the rotor on the other hand in any manner necessitated by the characteristics of a particular reverse flow cooled turbine-generator. Thus, by shifting the position of the baffle walls 80 and 82 the relative size of the areas 53 and 54, defined by the U-shaped baffles, and the area 58 may be varied. Thus where it has been found that heating in the body portion 18 of the rotor has become a limiting factor on the output capability of a particular turbine-generator, the baffle means 48 may be easily dimensioned to increase the area 58 and decrease the areas 53 and 54, thereby causing a greater proportion of the cooling gas to be directed to the stator and to the body portion of the rotor. Conversely, of course, should a given generator require more cooling in the rotor end turn portion, the areas 53 and 54 may be increased at the expense of the area 58. Thus, the baffle means of this invention provides a substantial flexibility in easily adapting the cooling gas flow to the requirements of a particular machine.

To provide for more effective cooling in the body portion of the rotor, annular stator baffles, two of which are shown at 85, may be disposed along the interior of the stator between inlet zones (those zones including cooling passages 10) and outlet zones (those zones including cooling passages 11). The inlet zones and outlet zones are alternately positioned axially along the gas gap 15. Additionally, annular rotor baffles, two of which are shown at 88, are disposed around rotor 14, each of the rotor baffles being in line with a corresponding one of the stator baffles and in sealing relationship therewith. The utilization of aligned stator and rotor baffles between the inlet zones and the outlet zones increases the effectiveness of transmission of cooling gas from the stator to the body portion of the rotor and thus better ensures transmission to the body portion of the rotor of the cooling gas directed to the stator by the baffle means 48, particularly where an increased amount of cooling is required by the body portion of the rotor.

By the cooling arrangement of this invention more effective cooling of the body portion is secured. The thermal performance of the body portion of the rotor is thus eliminated as a limiting factor on the output capability of the dynamoelectric machine. Moreover, the arrangement of the baffle means in relationship of the two coolers ensures effective operation of the machine under a reduced load condition should one of the coolers fail.

While there has been shown and described a specific embodiment of a reverse flow cooled dynamoelectric machine and the cooling arrangement therefor in accord with the present invention, it will be apparent to those skilled in the art that modifications may be made without departing from the substance of this invention and it is intended by the appended claims to cover such modifications as some within the spirit and scope of this invention.

What is claimed is:

1. A reverse flow cooled dynamoelectric machine comprising:
   a. a gas-tight casing containing cooling gas;
   b. a stator core including radial passages for flow of gas;
   c. a rotor defining a gas gap with the stator core and having a body portion and an end turn portion;
   d. fan means mounted on said rotor for circulating cooling gas from said gas gap to gas coolers;
   e. first and second gas coolers mounted in said casing in side-by-side relationship, said gas coolers communicating with an outlet of said fan means to receive and cool gas pumped therefrom;
   f. first conduit means for conducting gas from both said first and second coolers to said rotor end turn portion;
   g. second conduit means conducting gas from both said first and second coolers to said stator cooling passages and said rotor body portion; and
   h. baffle means disposed in said casing in abutting spaced relationship with both said coolers and extending radially outward from said coolers to an inner wall of said casing, said baffle means being shaped to direct a portion of the gas cooled by each of said coolers to both first and second conduit means, thereby ensuring a flow of cooling gas both to said stator and said body portion of said rotor and to said end turn portion of said rotor with only one of said coolers operating.

2. The apparatus of claim 1, wherein said baffle means comprise:
   a. first and second spaced U-shaped baffles extending transversely across both coolers, the interior of said baffles providing communication between said first conduit means and said first and second gas coolers; and
   b. a planar baffle engaging adjacent free ends of said U-shaped baffles, the area defined by said planar baffle and said U-shaped baffles providing communication between said first and second gas coolers and said second conduit means.

3. The apparatus of claim 2, wherein said U-shaped baffles and said planar baffle are dimensioned to proportion gas flow from both coolers to the rotor end portion and to the stator and rotor body portion in accordance with the cooling requirements of these components of the machine.

4. The apparatus of claim 1 wherein:
   a. said casing includes a removable dome;
   b. said coolers are positioned within said removable dome; and
   c. said baffle means is positioned within said removable dome radially outward of said coolers; and
   d. upper edges of said baffle means abut said inner wall of said dome in sealing relationship.

5. The apparatus of claim 4 and further including:
   a. a plurality of gas inlet zones and gas outlet zones positioned in axially alternating relationship along said gas gap, each of said zones communicating with corresponding radial passages in said stator core;
   b. a plurality of annular rotor baffles, one of said rotor baffles being secured to said rotor between each adjacent inlet and outlet zone; and
   c. a plurality of annular stator baffles, one of said stator baffles being secured to said stator between each adjacent inlet and outlet zone, each of said stator baffles being in sealing relationship with a corresponding one of said rotor baffles.

* * * * *